(12) United States Patent
Johansson

(10) Patent No.: US 9,309,581 B2
(45) Date of Patent: Apr. 12, 2016

(54) METHOD FOR CREATING A HARDENED STEEL ASSEMBLY

(71) Applicant: Volvo Car Corporation, Goteborg (SE)

(72) Inventor: Richard Johansson, Landvetter (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 14/262,534

(22) Filed: Apr. 25, 2014

(65) Prior Publication Data

US 2014/0327272 A1  Nov. 6, 2014

(30) Foreign Application Priority Data

May 2, 2013  (EP) .................................... 13166221

(51) Int. Cl.
| | | |
|---|---|---|
| B23K 11/34 | (2006.01) | |
| C21D 8/00 | (2006.01) | |
| B23K 9/025 | (2006.01) | |
| B23K 26/24 | (2014.01) | |
| C21D 9/50 | (2006.01) | |
| B23K 31/02 | (2006.01) | |
| B62D 23/00 | (2006.01) | |
| C21D 9/46 | (2006.01) | |
| C21D 1/673 | (2006.01) | |

(52) U.S. Cl.
CPC ................ C21D 8/005 (2013.01); B23K 9/025 (2013.01); B23K 11/34 (2013.01); B23K 26/24 (2013.01); B23K 31/02 (2013.01); B62D 23/00 (2013.01); C21D 9/46 (2013.01); C21D 9/50 (2013.01); B23K 2201/006 (2013.01); B23K 2203/04 (2013.01); C21D 1/673 (2013.01)

(58) Field of Classification Search
CPC ........ B62D 25/06; B23K 9/025; B23K 11/34; B23K 11/24; C21D 9/50
USPC .................. 296/193.06, 203.01, 205, 29, 303
See application file for complete search history.

(56) References Cited

U.S. PATENT DOCUMENTS

| | | | |
|---|---|---|---|
| 3,257,835 A | 6/1966 | Cofer et al. | |
| 6,578,909 B1 * | 6/2003 | Reed et al. ..................... | 296/210 |
| 2002/0104591 A1 | 8/2002 | Gehringhoff et al. | |
| 2008/0277036 A1 | 11/2008 | Johansen | |
| 2009/0242086 A1 * | 10/2009 | Thomas ................. | C21D 1/673 148/654 |
| 2011/0232808 A1 | 9/2011 | Pellmann et al. | |
| 2012/0216920 A1 * | 8/2012 | Nam .................... | B21D 22/022 148/241 |
| 2012/0267919 A1 | 10/2012 | Yoshida et al. | |

OTHER PUBLICATIONS

European Patent Office, Extended European Search Report of EP13166221.5, Germany, Oct. 28, 2013, 8 pages.

* cited by examiner

*Primary Examiner* — Pinel Romain
(74) *Attorney, Agent, or Firm* — Alleman Hall McCoy Russell & Tuttle LLP

(57) ABSTRACT

A method of creating a hardened steel assembly from at least two parts may include the consecutive steps of first joining the at least two parts in a cold formed state to form an assembly, and then hardening the joined assembly.

10 Claims, 2 Drawing Sheets

METHOD FOR CREATING A HARDENED STEEL ASSEMBLY

CROSS REFERENCE TO RELATED APPLICATIONS

The present application claims priority to European Patent Application No. 13166221.5, filed on May 2, 2013, the entire contents of which are hereby incorporated by reference for all purposes.

TECHNICAL FIELD

The present invention relates to a method of creating a hardened steel assembly from at least two parts.

BACKGROUND ART

Today most manufacturing processes involve the manufacture of more or less complicated structures from several parts of metallic material such as steel. To achieve a solid structure various welding techniques are used to join these parts together in a durable fashion. In the case of vehicle cages the durability of these cages are of paramount importance for the safety of vehicle operators and passengers e.g. in case of accidents such as collisions. The strength of the welds between these parts is critical for the durability of the structure, especially under load.

A commonly used process for enabling UHSS (Ultra High Strength Steel) involves hardening the parts by various means to achieve hot formed parts (U.S. Pat. No. 3,257,835, Method for hot forming metal) and subsequently pressing them to achieve the desired shape, as well as allowing them to cool. What follows are a variety of post-processing techniques aimed at achieving various qualities of the material. After said post-processing, said metallic parts are joined together by various welding techniques. Such welding techniques may include spot-welding, laser welding, gas metal arc welding (GMAW), etc. During such welding processes, heat added leads to a phase change from a martensite structure to contain also bainite, ferrite and/or perlite structure in the already hot formed parts. The bainite, ferrite and perlite structures have the effect of lowering the durability of the material; for example, the elongation ($A_{80}$) of martensite is about 5%, whereas the same value for ferrite and perlite is greater than 15%. The proof stress ($R_{p0, 2}$) and tensile strength ($R_m$) of martensite compared to ferrite and perlite are 1050 MPa versus 450 MPa and 1500 MPa versus 600 MPa, respectively. These properties are of great importance for the ability of a material to provide an effective seal and withstand stress, which are critical aspects of durability. Especially affected are the heat-affected zones (HAZ). The HAZ are defined as the regions around a weld center susceptible to structural change due to the heating resulting from the welding, in the range of 3.5 mm to 7 mm from the weld center. Structural change in these areas may lead to the creation of metallurgical notches which are especially susceptible to cracks when loaded.

SUMMARY OF THE INVENTION

The object of the present invention is therefore to overcome the problems mentioned above.

According to one aspect of the present invention, the method of creating a hardened steel assembly from at least two parts comprises the consecutive steps of first joining the parts in a cold formed state to form an assembly, followed by hardening the joined assembly. By performing the hardening process after the joining of the parts, a fully martensitic structure in the steel and joints is achieved. Said method leads to improved strength in and around the joints and increased durability of the assembly.

According to another aspect of the present invention, the joining of the at least two parts comprises a welding process. Known welding processes include, but are not limited to, spot welding, laser welding and gas metal arc welding. When the hardening process is performed after the welding, a fully martensitic structure is achieved not only in the part itself but also in and around the welded joints. Said method thus allows for a structure without metallurgical notches like in prior art with the HAZ. The method according to said aspect leads to improved strength in and around the welds and increased durability of the assembly.

According to yet another aspect of the present invention, at least one of the parts is cold formed by pressing before the hardening process. By pressing the parts, a desired shape of the parts can be achieved for inclusion in an assembly. A further advantage of pressing before the hardening process is that the parts are more easily shaped into the desirable shapes because the parts can be pressed in several steps. Thus, closed structures can be achieved whereas when pressed in the warm state there is generally one pressing available, and as a result only open structures can be produced in this classic way.

According to a further aspect of the present invention, the hardening process is followed by tempering. For steel, tempering is usually performed after hardening, to reduce some of the excess hardness, and is done by heating the steel to a much lower temperature than was used for hardening. The exact temperature determines the amount of hardness removed, and depends on both the specific composition of the alloy and on the desired properties in the finished product.

Optionally, the steel used in the process of the present invention may be boron steel. Manufacturing the part from boron steel increases strength, decreases cracking, and lowers the possibility of distortion of said part.

In one aspect of the invention, the method is used to achieve enhanced durability in an assembly used in a product expected to be able to withstand large loads. One example of such an environment includes components of vehicles, where said vehicles may be the target of stress in e.g. collisions or accidents. One such embodiment is in a vehicle sub assembly such as e.g. a vehicle safety cage. The method disclosed in the present invention can advantageously be incorporated in a vehicle construction line, in order to facilitate mass production of vehicles incorporating the methods detailed in the present invention.

BRIEF DESCRIPTION OF THE DRAWINGS

The invention will now be described in more detail with reference to the enclosed figures.

DETAILED DESCRIPTION

Figure 1A:
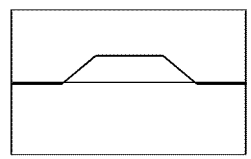
FIGS. 1A-1E show various steps of the method according to the present invention.

FIG. 1a symbolizes the first step of the method according to an example of the present invention where at least one part 2, 3 of the assembly 1 to be created is cold formed by pressing. Other examples of cold forming are for instance pressing and rollforming.

Figure 1B:
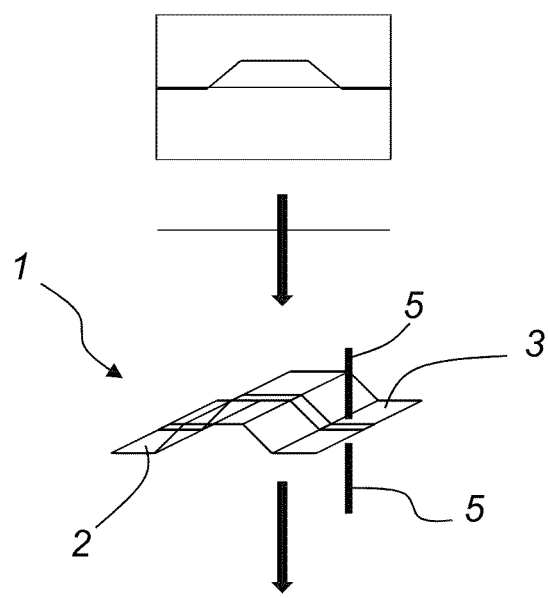

In the second step shown in FIG. 1b, the parts 2, 3 are joined. Optionally, the parts are joined by means of a welding device 5. In some examples, welding device 5 may perform laser welding, GMAW, or spot welding.

Figure 1C:
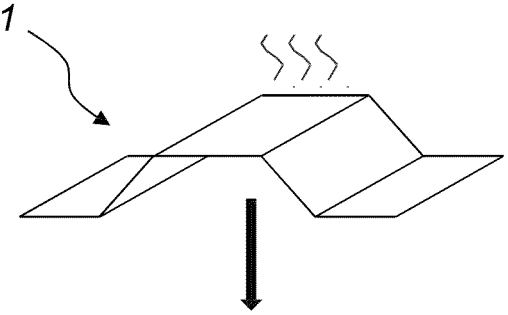
Figure 1D:
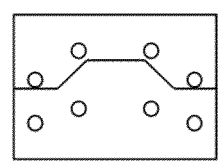

In the third step shown in FIGS. 1c and 1d, the assembly 1 is hardened, e.g. first heated (see FIG. 1c) and then cooled (see FIG. 1d).

Figure 1E:
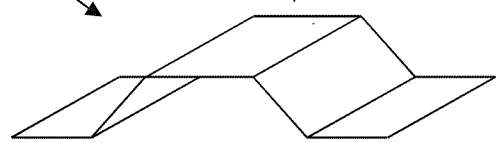

Finally, the hardened steel assembly is removed from the hardening process when the temperature reaches somewhere between 80 and 100 degrees centigrade inclusive (FIG. 1e). If the hardened steel assembly is removed at a temperature higher than 100 degrees centigrade, the advantage is that the overall process will be faster. On the other hand, the assembly may be more difficult to handle due to the high temperature, and there is also the risk that the assembly will change its form due to being handled at the high temperature. In contrast, if the hardened steel assembly is removed at a lower temperature than 80 degrees centigrade, the only thing affected may be the process time (e.g., the process may be slower).

Figure 2:
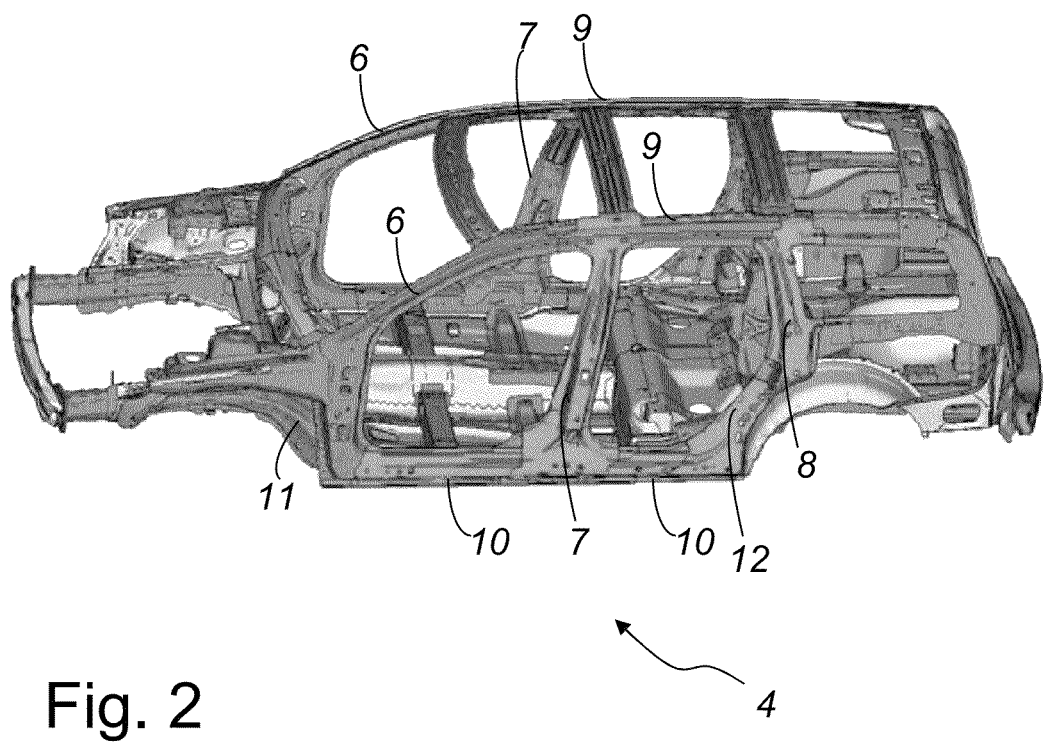
FIG. 2 is a perspective view showing an example of a safety cage assembled according to the present invention.

FIG. 2 shows an example of a safety cage 4 assembled according to the present invention. The safety cage 4 is an example of the final assembled, welded and hardened part. Optionally, the safety cage 4 may be made from boron steel. In one example, 40% of the safety cage may incorporate hot-formed boron steel, which may significantly improve the strength of the safety cage without adding mass or weight. In contrast, other safety cages incorporating boron steel may include far less boron steel, e.g. 7% of the material may incorporate boron steel. Safety cage 4 is drawn approximately to scale and shows details of the shape, structure, relative size, and positioning of various components of safety cage 4.

In the depicted example of safety cage, parts of the cage which may at least partially incorporate boron steel are labeled. For example, A-pillars 6, B-pillars 7, C-pillars 8 (of which only one is visible in the view of FIG. 2), upper frame portions 9, rocker panels 10, and front cage portion 11 (which may span across the vehicle laterally), and six line 12 may incorporate boron steel, whereas the remaining parts of the safety cage may not incorporate boron steel. However, it will be appreciated that in other examples, fewer or more parts of the safety cage may incorporate boron steel, or none of the safety cage may incorporate boron steel, without departing from the scope of this disclosure.

The foregoing is a disclosure of an example practicing the present invention. However, it is apparent that the method incorporating modifications and variations will be obvious to one skilled in the art. Inasmuch as the foregoing disclosure is intended to enable one skilled in the art to practice the instant invention, it should not be construed to be limited thereby, but should be construed to include such modifications and variations as fall within the scope of the claims. For instance, two or more sheets of steel could be joined in a first step and thereafter pressed to a desired shape before the hardening process.

The invention claimed is:

1. A method of creating a hardened steel assembly from at least two parts made of steel, comprising the consecutive steps of first joining the at least two parts in a cold formed state to form a steel assembly, the joining comprising a welding process which includes one or more of spot welding, laser welding, or gas metal arc welding, and then hardening the steel assembly.

2. The method according to claim 1, further comprising forming at least one of the parts by pressing before the hardening process.

3. The method according to claim 1, wherein the hardened steel assembly is removed from the hardening process at a temperature between 80 and 100 degrees centigrade inclusive.

4. The method according to claim 1, wherein said steel of the hardened steel assembly is boron steel.

5. The method according to claim 1, wherein said hardened steel assembly fully or in part constitutes a vehicle sub assembly.

6. The method according to claim 5, wherein said vehicle sub assembly is a vehicle safety cage.

7. A method of manufacturing a vehicle safety cage comprising a hardened steel assembly, the hardened steel assembly made by the steps of: joining, by one of spot welding, laser welding, or gas metal arc welding, at least two parts made of steel in a cold formed state to form a steel assembly; and then hardening the steel assembly, to form a joined steel assembly.

8. The method of claim 7, wherein at least one of said parts is formed by pressing before the hardening.

9. The method of claim 7, wherein the method further comprises removing the hardened joined steel assembly from the hardening process at a temperature between 80 and 100 degrees centigrade inclusive.

10. The method of claim 7, wherein said steel of the hardened steel assembly is boron steel.

* * * * *